May 12, 1925.　　　　　　　　　　　　　1,537,828
F. H. JONES
TRANSMISSION GEAR
Filed Aug. 21, 1923　　　6 Sheets-Sheet 1
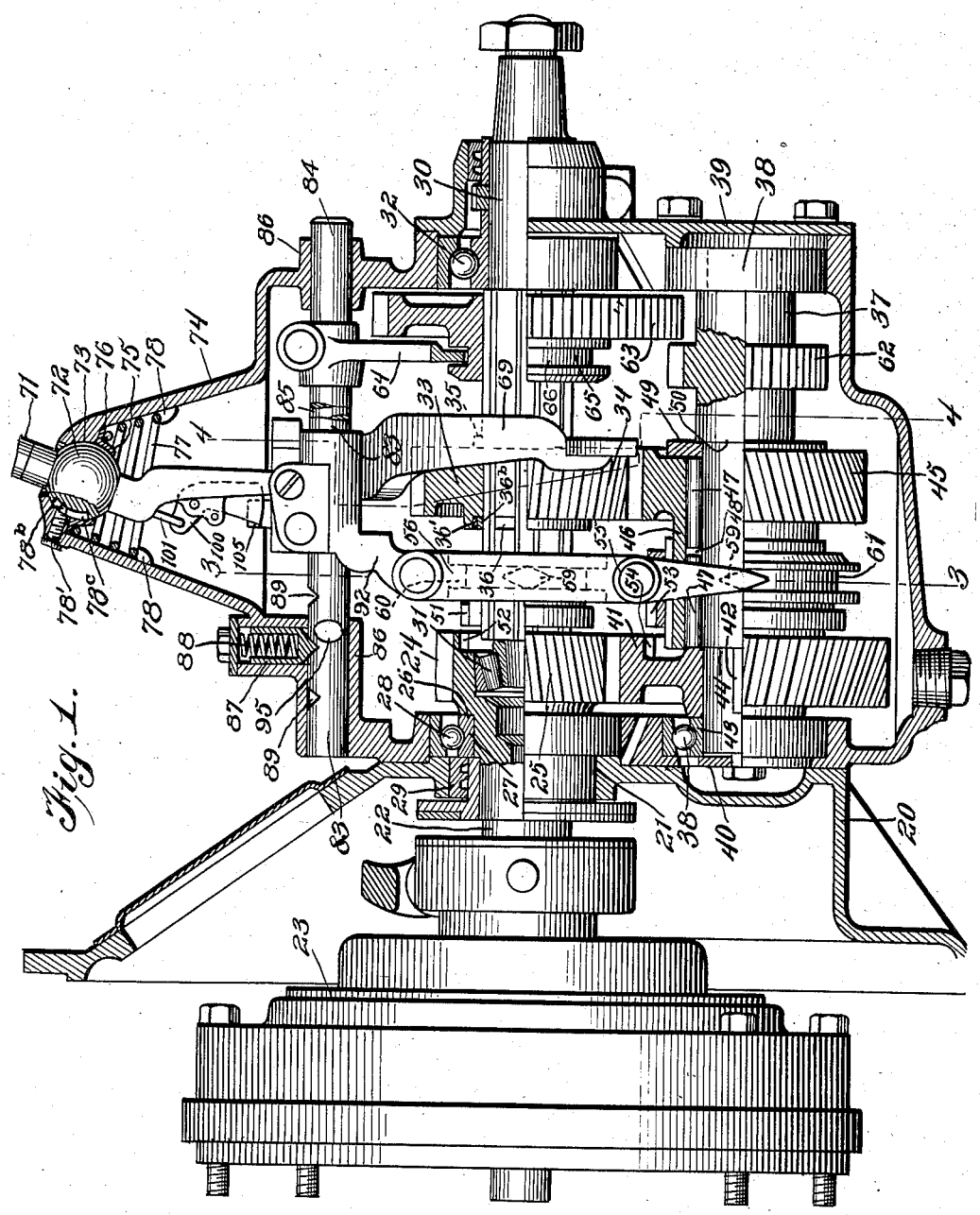
Inventor
Frank H. Jones
Attys

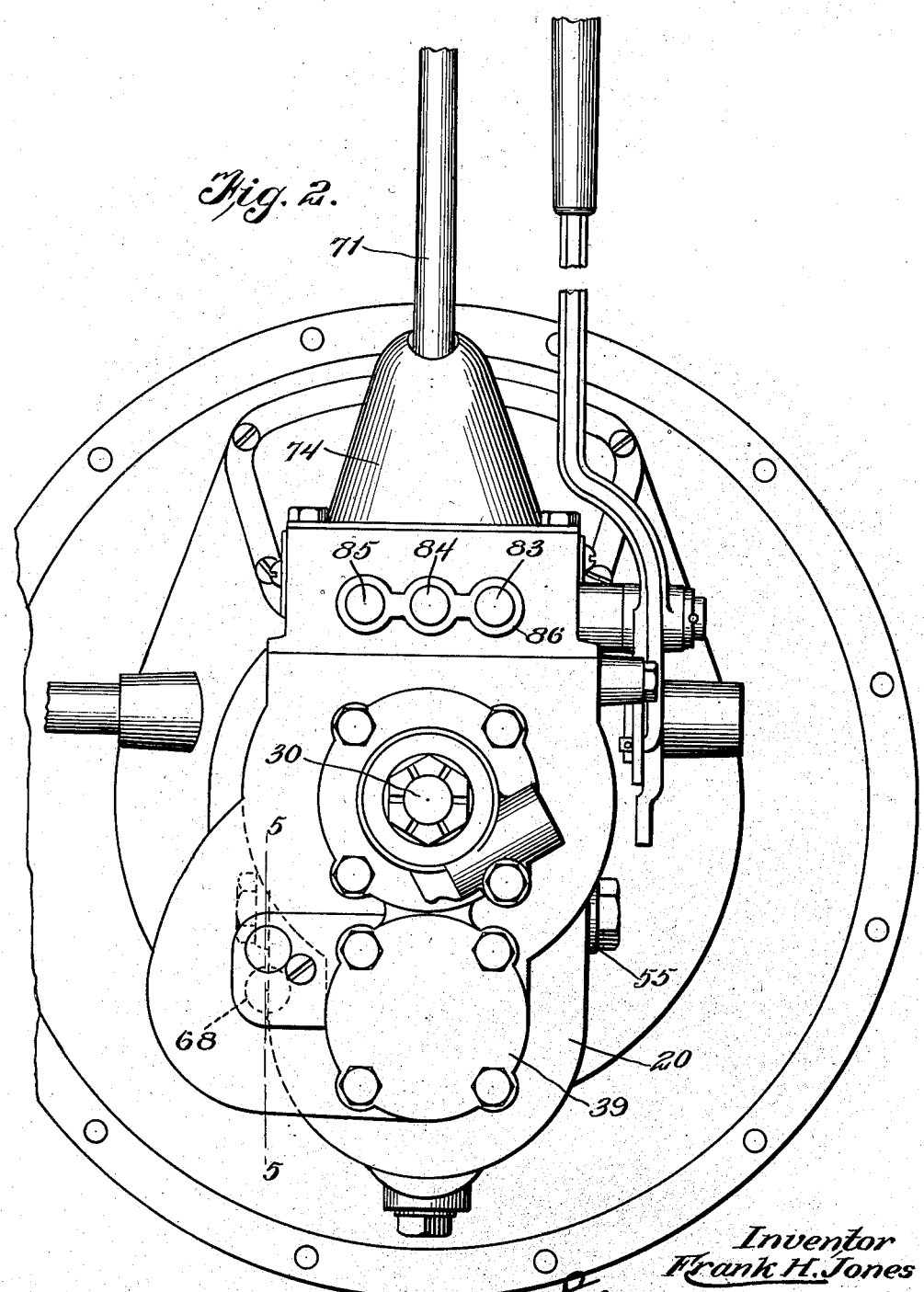

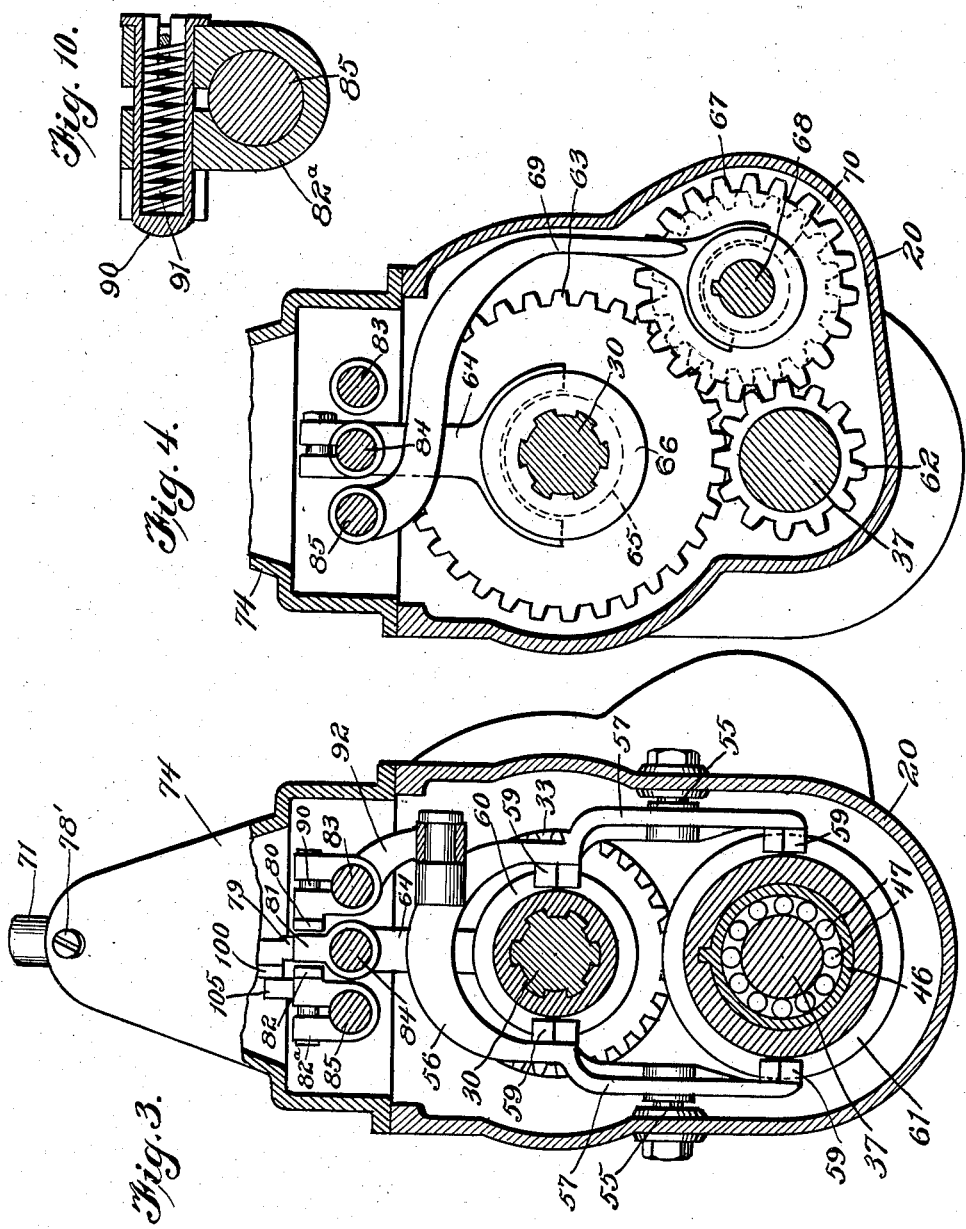

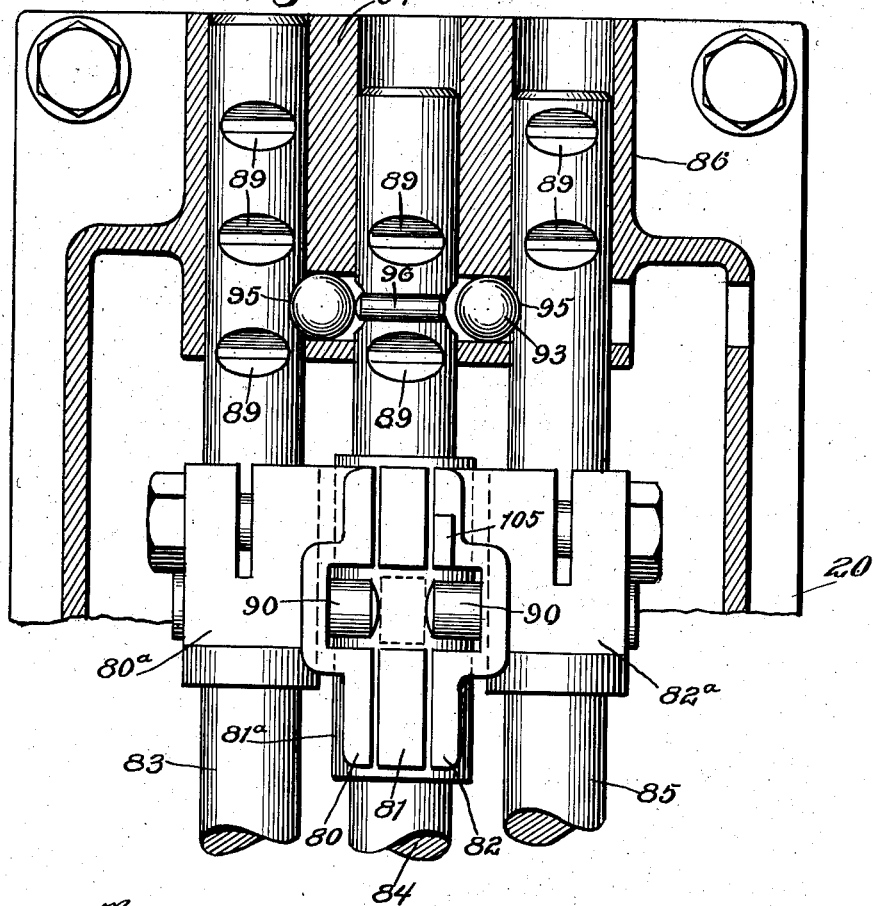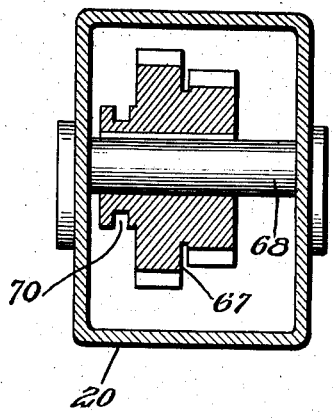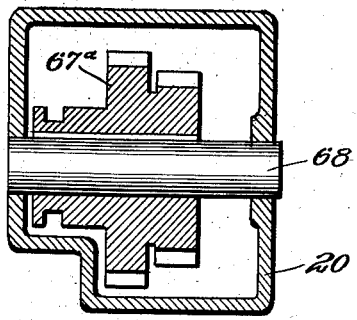

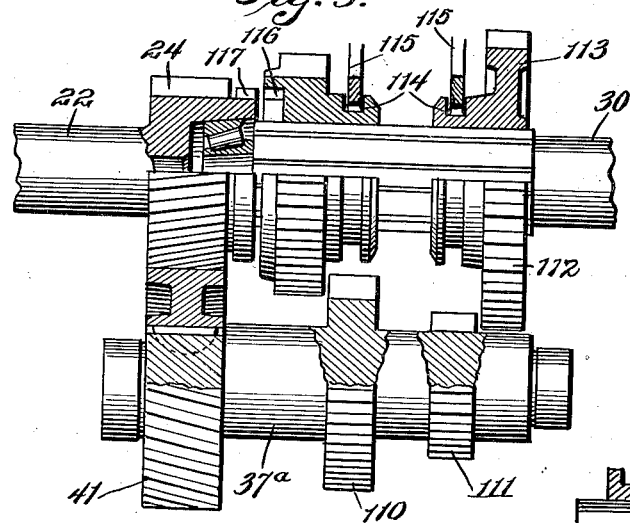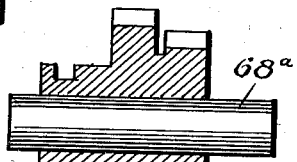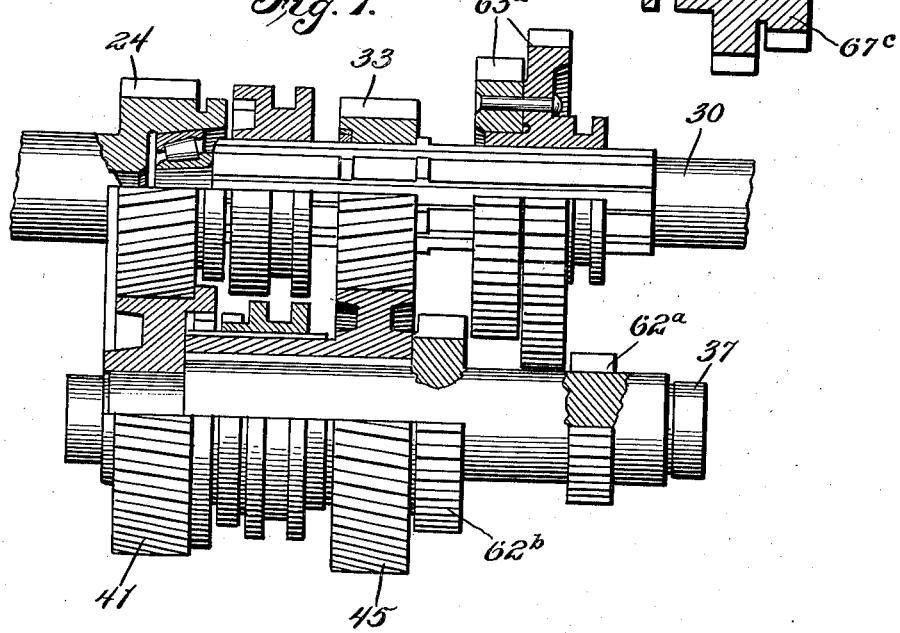

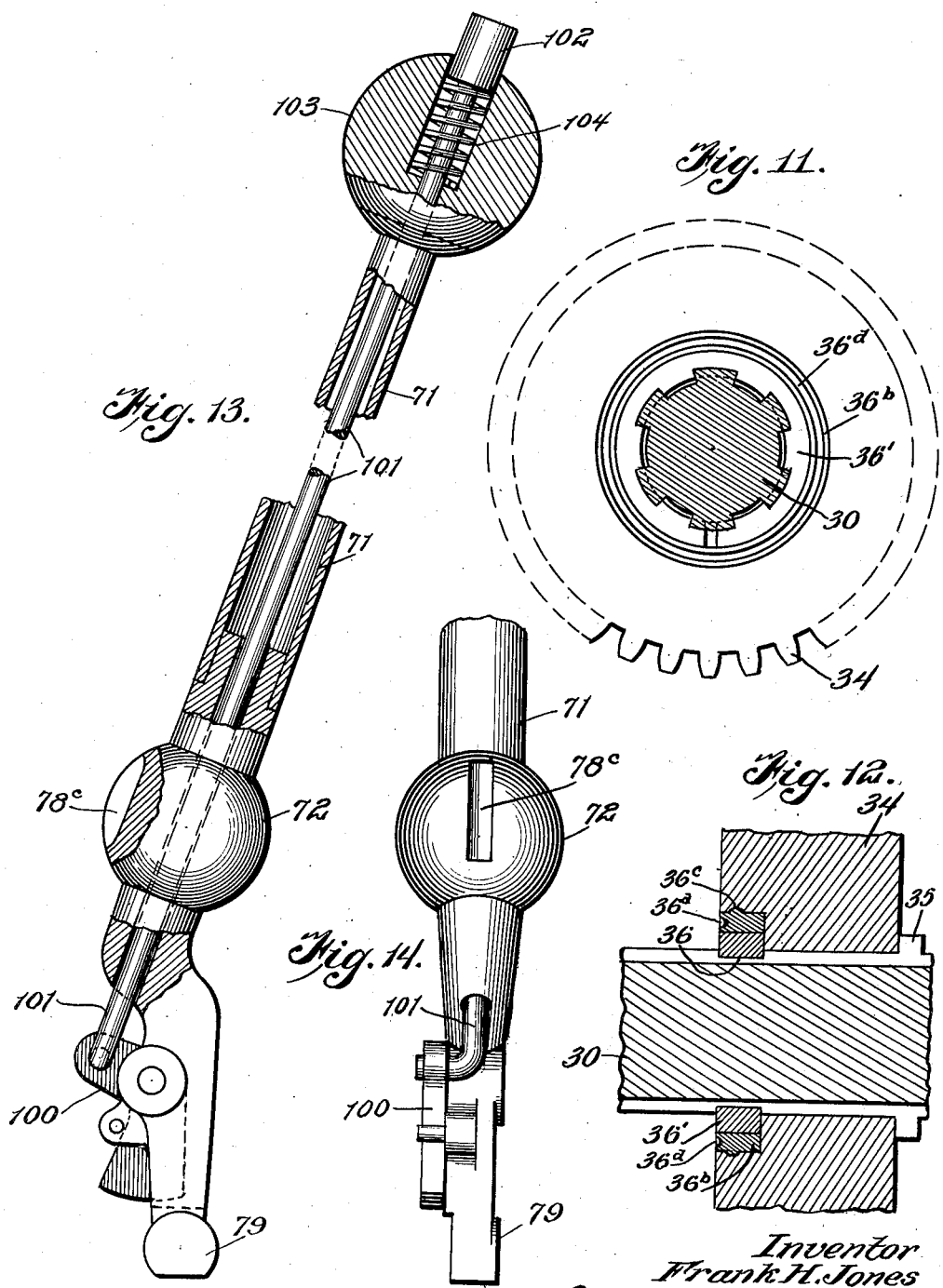

Patented May 12, 1925.

1,537,828

UNITED STATES PATENT OFFICE.

FRANK H. JONES, OF CLEVELAND, OHIO.

TRANSMISSION GEAR.

Application filed August 21, 1923. Serial No. 658,610.

*To all whom it may concern:*

Be it known that I, FRANK H. JONES, a citizen of the United States, residing at Cleveland, in the county of Cuyahoga and State of Ohio, have invented new and useful Improvements in Transmission Gears, of which the following is a specification.

The object of the invention is to provide a transmission gear for use in connection with motor-driven vehicles both of the high speed and heavy service types wherein helical toothed gears may be effectively used particularly for the high speed adjustments so as to obtain the advantage of smoothness and noiselessness of transmission due to the engagement of succeeding teeth before the disengagement of the preceding teeth, under conditions, which adequately take care of and compensate for the end or axle thrust incident to the use of gears of this type whether they are motor-driven or are actuated by the propeller shaft when the motor is operating under compression, so that undue wearing and possible tilting or displacement to even a small degree of the gear units or their mountings may be avoided; and with these objects in view the invention consists in a construction and combination of parts of which a preferred embodiment is shown in the accompanying drawings, wherein:

Figure 1 is a longitudinal sectional view of a transmission gear of the three-speed type constructed in accordance with the invention.

Figure 2 is a rear end view of the same.

Figures 3 and 4 are transverse sectional views on the planes represented by the lines 3—3 and 4—4 of Figure 1.

Figure 5 is a detail sectional view on the plane indicated by the line 5—5 of Figure 2.

Figure 6 is a longitudinal sectional view of a gear of similar construction but of the four-speed type.

Figure 7 is a longitudinal detail sectional view of the gear elements of a device of the four-speed type.

Figure 8 is a plan view partly broken away of the gear shift mechanism.

Figure 9 is a view similar to Figure 7 but of a modified form.

Figure 9ª is a longitudinal sectional view of the idler gear associated with the modified form shown in Figure 9.

Figure 10 is a transverse sectional view through one of the outer gear shifting blocks.

Figure 11 is an elevational view, partly in section, showing the method of connecting the driven spiral gear to the driven shaft.

Figure 12 is a transverse sectional view of the structure of Figure 11.

Figure 13 is an elevational view partly in section, of the shift lever.

Figure 14 is a front elevational view of the lower extremities of Figure 13.

Within a suitable casing 20 having an opening 21 in its front wall is mounted the rear end of a drive shaft 22 with which, as indicated in Figure 1, is connected a clutch 23, the drive shaft carrying the drive gear 24 which is provided with helical teeth 25 and is shouldered, as indicated at 26, for contact with the inner ring 27 of an antifriction thrust bearing 28. The opening in the casing wall is fitted with a bearing ring 29 and the thrust bearing is made of sufficient dimensions to effectively resist any thrust strain which may be applied thereto through the shoulder 26 due to the angular disposition of the gear teeth. Mounted in the casing in axial alignment with the drive shaft is the driven or propeller shaft 30 having front and rear end bearings 31 and 32 respectively provided in the drive gear 24 and in the rear wall of the casing and being of the thrust resisting type. The forward bearing 31 preferably has tapered or frusto-conical bearing rollers while the rear bearing is provided with bearing balls which, however, are of large diameter and, like the balls of the drive shaft bearing 28, are mounted in bearing rings which extend toward the axis of the shaft at their outer ends to effectively resist end thrust. In their inclined positions the rollers in the bearing 31 perform a like function in resisting thrust strains applied to the propeller or driven shaft in a forward direction.

The propeller shaft carries a second gear 33 provided with helical teeth 34, this gear being keyed through the medium of longitudinal ribs to the propeller shaft to turn therewith under all conditions. The end thrust in opposite directions of the second gear is communicated to the propeller shaft and ample provision is made to resist the shaft thrust by reason of the bearings 31 and 32 above described, this thrust being transmitted to the propeller shaft in one direction from the gear 33 through shoulders 35 (which form integral parts of the key-ribs) and against which the gear abuts. The opposite face of the gear is counterbored at the eye and the propeller shaft in transverse alignment with the counterbore is provided with an annular recess or seat 36 in which a split ring 36′ engages, the ring being capable of snapping over the shaft to engage in the seat 36 and being disposed in concentric relation in the counterbore of the gear by a holding ring 36$^b$, the latter being a solid ring of an interior diameter to snugly surround the split ring when the latter is expanded and to snugly engage the inner peripheral wall of the counterbore. The solid ring prevents the split ring 36′ from expanding enough for disengagement from the seat and thus movement of the gear longitudinally of the propeller shaft is precluded. In order that the holding ring 36$^b$ may be held securely in place, the peripheral wall of the gear 33 is grooved, as indicated at 36$^c$, and the holding ring, when seated, is swaged into this groove by forcing the stock from the outer peripheral surface thereof up into the groove through a swaging operation resulting in the formation of a groove 36$^d$ formed by the swaging tool.

Parallel with the propeller and drive shaft there is mounted a countershaft 37 having the terminal thrust bearings 38 which are of the ball type similar to the bearings 32 and 28, these bearings being closed at the outer ends of the shaft by bearing plates 39 and 40. The countershaft has keyed thereon, as at 42, a driven gear 41, the hub of which is in bearing relation at one end with the bearing ring 43 of the forward bearing 38 and at the other end with a shoulder 44 on the countershaft. This driven gear is provided with helical teeth matching and meshing with those on the drive gear 24.

Carried by the countershaft in mesh with the gear 33 and therefore having helical teeth to correspond therewith is a countershaft drive gear 45 which, however, is free to rotate with relation to the countershaft and is provided with an extended sleeve 46 separated interiorly from the shaft by appropriate bearings 47 arranged in a plurality of series separated at their adjacent ends, as indicated at 48. The thrust of the gear 45 in a forward direction is communicated directly to the driven gear 41 through the bearing on the end of the sleeve 46 of said gear while thrust in the rearward direction is communicated to the countershaft through a bearing disk 49 which bears against the shoulder 50 of the countershaft.

Slidably mounted on and keyed to the propeller or driven shaft is a clutch member 51 of toothed form for engagement with a complemental clutch member formed in a suitable seat or recess 52 in the gear 24. Correspondingly keyed upon the sleeve 46 of the gear 45 and adapted for sliding movement with reference thereto is a clutch member 53 designed for engagement with a complemental clutch member formed in a recess 54 in the driven gear 41. Mounted in the casing upon suitable trunnions 55 is a rocker 56 constituting a clutch shifting element in the form of a yoke of which the trunnions are disposed at intermediate points in the lengths of the arms 57 which carry oppositely beveled lugs 59 operating in the channels or grooves 60 and 61 of said clutch members to the end that when the rocker is moved in one direction, the propeller or drive shaft will be directly locked to the drive gear 24 and when moved in the opposite direction the gear 45 will be locked to the driven gear 41 so that motion will be communicated to the propeller shaft from the main drive shaft 22 through the gear couple 24—41 to the countershaft 37 and then through the gear couple 45—33. The oppositely beveled or diamond-shaped lugs of the rocker serve to insure a flat and efficient bearing upon the side walls of the channels in the clutch members when the clutches are respectively in set position.

The low or first speed mechanism in a three-speed transmission embodies the gear 62 on the countershaft and the gear 63 keyed to the propeller shaft and longitudinally movable therewith by means of a shifting arm 64 engaging a channel 65 in the collar 66. When the arm 64 is operated to shift the gear 63 along the propeller shaft into engagement with the gear 62, motion is transmitted from the drive shaft 22 through the gear couple 24—41 to the countershaft 37 and thence to the propeller shaft through the gear couple 62—63. Reverse motion is secured by means of a double idler gear 67 mounted upon a separate countershaft 68 for sliding movement into and out of meshing relation with the gears 62 and 63, this double idler being under control of a shifting arm 69 engaging a channel 70 of the double idler. Normally, the double idler is static, the smaller unit being in the same transverse plane as the gear 62. When the arm 70 is actuated however, the double gear 67 is moved along its shaft 68 until the smaller unit meshes with the gear 63 and the larger unit with the gear 62 when a rotary motion of the propeller shaft is secured, the reverse of the direction in which the drive shaft 22 travels.

A gear shift lever 71 as shown is provided with a bearing ball 72 mounted in a spherical socket 73 carried by the hollow conical support 74 which is arranged in a rearwardly inclined position to enable the use of a straight shifting lever so as to direct the latter normally rearward and thus avoid the use of bent levers so common in practice. The bearing ball is maintained in its seat in the socket by means of a spherical-shaped follower 75 provided with a peripheral flange 76 against which is seated the upper end of a helical spring 77, the lower end of which is seated on lugs 78 carried by and formed on the inner wall of the hollow support. In order to prevent angular or turning movement of the shift lever in a plane at right angles to its normal movement, there is provided a set-screw 78' threadingly engaged with the hollow support and provided with a nose or terminal 78$^b$ engaging a groove or slot 78$^c$ formed in the bearing ball, this slot being formed normally in the plane of the lever so that the set-screw may not interfere with the angular movement of the lever in a vertical plane but may preclude turning movement of the same.

The gear shift lever is provided at its lower end with a head 79 which is adapted to communicate motion selectively to the shifting blocks 80, 81 and 82 which respectively form parts of or are secured to clamps 80$^a$, 81$^a$ and 82$^a$ which are secured to the slide bars 83, 84 and 85. These slide bars are arranged in parallelism and occupy a common horizontal plane, being mounted in guides 86 in the casing. For use in locking or frictionally securing the slide bars in their neutral and adjusted positions, it is desired to use in connection with each a follower bolt 87 actuated by a spring 88 and having a bevel or V-nose for engagement with corresponding seats or depressions 89 formed in the slide bars.

In its neutral position, the head of the gear shifting lever is in the plane of operation of the intermediate shifting block 81 which, in the construction illustrated in the three-speed form, is assigned to first or low speed and is attached by the clamp 81$^a$ to the slide bar 84 which carries the shifting arm 64 for varying the position of the gear 63. Obviously, rearward movement imparted to the shifting lever 71 will shift the head 79 forwardly, thus imparting forward movement to the slide bar 84 through the shifting block carried thereby. The result will be the meshing of the gear 63 with the gear 62 and the attainment of the third or lowest speed of the propeller shaft. The gear shifting lever is held yieldingly in its neutral position against lateral swinging movement by detents 90 which respectively overlap the shifting blocks 80 and 82 and yieldingly bar engagement of the head 79 of the shifting lever with the seats formed in the blocks 80 and 82. The detents are actuated by springs 91. If the shifting lever is swung laterally in one direction to engage it in opposition to the detent with the shifting block 80, it is then in position for the action of the slide bar 83 and may be moved forwardly or rearwardly to actuate said slide bar. Since the connection between the rocker 56 and the shifting block 80 is by means of the link 92, forward or rearward movement of the shifting lever when engaged with the block 80 will correspondingly actuate the rocker 56. If moved forwardly, the clutch members 53 and 54 will be engaged and the propeller shaft receive motion from the drive shaft through the gear couples 24—41 and 45—33; if moved rearwardly, the clutch members 51 and 52 will be engaged and motion transmitted to the propeller shaft direct from the drive shaft 22.

If the shift lever, when in neutral position, is swung laterally to engage the head 79 with the seat in the block 82 by the depression of the detent therein and is thereafter moved forwardly, the slide bar 85 will be moved rearwardly and with it the arm 69 and the double idler gear 67 so that reverse motion will be imparted to the propeller shaft through the gear 62, the double idler 67 and the gear 63.

To avoid the possibility of displacing by jarring or movement of one slide bar when another is actuated, there is provided an interlocking construction consisting of balls 93 arranged in the partitions 94 between the guides for the slide bars and adapted at diametrically opposite points to invade said guides and engage seats 95 in the guide bars. In the intermediate guide bar there is also arranged a shifting pin 96 which terminally protrudes into the seats 95 of said bar. When one of the slide bars is moved longitudinally in its guide, it represses the ball 93 which is in engagement therewith, forcing it laterally to engage the next slide bar and thereby locking the latter against movement. If, for example, the reverse slide bar is actuated, it displaces the interlocking ball laterally to engage the intermediate slide bar and at the same time moves the slide pin 96 to force the other ball 93 into locking engagement with the slide bar which controls the rocker and therefore the second and third seats, so that the movement of the reverse slide bar serves to lock the remaining slide bars against movement and holds them locked until the reverse slide bar has been returned to its normal or neutral position. So it is with any of the other bars, the movement of which locks the remaining bars until the actuated bar is returned to neutral position. Thus, overlapping action of the elements is prevented and the possibility of moving any of the elements to throw one speed gear into operative position while another is in operative position or before the latter has been returned to neutral position is entirely avoided.

As a means to prevent the inadvertent actuation of the reverse mechanism, there is provided a lock designed to prevent the lateral movement of the gear shift lever to engage the block 82 which actuates the reverse mechanism. This lock comprises a bell crank lever 100 pivoted on the gear shift lever between the head 79 and the bearing ball 72. The shorter arm of the bell crank lever 100 is pivotally connected with an actuating rod 101 extending through the gear shift lever which is preferably of hollow construction and is provided with an actuating button 102 protruding beyond the handle 103 of the gear shift lever, the latter being of spherical form and housing an actuating spring 104 tending to keep the rod 101 normally elevated, so that the longer arm of the bell crank lever is disposed beside a lug 105 formed as a part of the block 82. Depression of the actuating rod 101 by pressure on the actuating button or head 102 rocks the bell crank lever 100 to move the longer arm back out of obstructing relation with the lug 105, whereupon lateral movement of the gear shift lever to engage the head 79 with the block 82 is possible, thus permitting the actuation of the reverse mechanism.

When the clutch is constructed for the accomplishment of four speeds forward, as shown in Figure 7, the construction is the same as in the three-speed type with the exception that the housing is made somewhat longer to permit the propeller shaft 30 carrying a double gear 63$^a$ comprising units of different diameters. The double gear 63$^a$, however, is designed to be shifted along the propeller shaft 30 in either direction so that the larger unit may be placed into mesh with the gear 62$^a$ carried on the countershaft 37; or in the opposite direction so that the smaller unit may be brought into mesh with the gear 62$^b$ also carried on the countershaft and which is disposed in abutting relation with the spiral gear 45 and takes the thrust of the latter. The gears 62$^a$ and 62$^b$ are spaced far enough apart to provide a clearing space between them for the double gear 63$^a$ which is the normal or inactive position of the latter and which, when moved rearwardly on the propeller shaft, meshes with the gear 62$^a$ and forwardly with the gear 62$^b$.

Reverse movement in the four-speed transmission is accomplished in the same way as in the three-speed, the shaft 68 being provided and having supported for longitudinal movement thereon a double idler gear 67$^a$ which is actuated in identically the same way as in the three-speed transmission. The normal or static position of the double idler gear 67$^a$ is with the smaller unit in the same plane as the gear 62$^a$ and the larger unit in a plane between the gear 62$^a$ and the end of the housing. Movement of the double idler gear is in the direction of the spiral gear 45 and it is in operative position when the smaller unit lies in the plane of the gear 63$^a$ with which it meshes and the larger unit in the plane of the gear 62$^a$ with which it meshes, when the propeller shaft is rotated in the opposite direction from the drive shaft 22. It will be noted that the reverse idler is static or at rest except when operating to reverse the propeller shaft or when the gear 63$^a$ is in mesh with the gear 62$^a$ when, of course, it will mesh with the smaller unit of the double idler gear 67$^a$ and rotate the latter. In all other speeds, however, the double idler gear remains at rest. It will be noted also in the three-speed transmission, from the arrangement of the parts, that the double idler gear is static or at rest except when operating to reverse the direction of the propeller shaft or when the gears 63 and 62 are in mesh.

In the modification shown in Figure 9, the drive shaft 22 carries the spiral gear 24 meshing with the spiral gear 41 on the countershaft 37$^a$ but motion is communicated from this countershaft to the propeller shaft 30 through ordinary spur gears, the spur gears 110 and 111 being carried by the countershaft and spaced from each other for being alternately brought in mesh with the sliding gears 112 and 113 which are keyed to the countershaft and provided with peripherally grooved hubs 114 for engagement by arms 115 carried by the slide bars, the gear 112 being provided with a clutch element 116 for engagement with a complemental clutch 117 carried by the gear 24 as in the three-speed and four-speed transmissions. Reverse movement in this modified construction is accomplished by means of a double idler gear 67$^c$ mounted on a countershaft 68$^a$ and disposed, when in its normal position, with the smaller unit in the plane of the gear 111 and the larger unit in a plane between the gears 110 and 111, the double idler gear being shifted rearwardly to engage the larger unit with the gear 111 and the smaller unit with the gear 113. In this construction, as in the others, the reverse gear is static excepting when operating to reverse the propeller shaft or when the mechanism is in the lowest or third speed, when the gear 115 will be in mesh with the gear 111 and the former therefore in mesh with the smaller unit of the double idler gear.

Having described the invention, what is claimed as new and useful is:—

1. A transmission mechanism including a shaft comprising axial driving and driven sections, the former having a gear provided with clutch teeth, a countershaft with a fixed gear meshing with the first gear, said fixed gear having clutch teeth, a gear loose on the countershaft and operatively geared to the driven section and provided with a sleeve, a clutch element splined on said sleeve, a clutch element on the driven section respectively positioned to cooperate with the clutch teeth of the first two gears, and unitary means operatively connecting with the clutch elements for shifting them respectively, one into engagement with the clutch teeth of the gear on the driving section, the other out of engagement with the clutch teeth of the fixed gear, and vice versa, whereby the driven section may operate for high speed or for second speed through the medium of the countershaft and the fixed gear.

2. A transmission mechanism including a shaft consisting of axial driving and driven sections and a countershaft, the driven section provided with a gear couple with the countershaft, one of the gears of said couple being loose on the countershaft and provided with a sleeve, a clutch slidably keyed to the sleeve, a clutch slidably keyed to the driven section, a gear couple operatively connecting the countershaft and the driving section, the gears of said last mentioned couple having clutch teeth, and a unitary member operatively connecting with said clutches of the driven section and the sleeve for moving them simultaneously, one to engage the clutch teeth of the gear of the driving section, the other out of engagement with the clutch teeth of the gear on the countershaft, and vice versa, whereby the driven section may operate for high speed direct from the driving section or the driven section operate for second speed through the gear couples and the countershaft.

3. A transmission mechanism including a shaft comprising axial driving and driven sections, the former having a gear provided with clutch teeth, a countershaft with a fixed gear meshing with the first gear, said fixed gear having clutch teeth, a gear loose on the countershaft and operatively geared to the driven section and provided with a sleeve, clutch elements splined on the driven section and the sleeve respectively positioned to cooperate with the clutch teeth of the first two gears, unitary means operatively connecting with the last mentioned clutches for shifting them respectively, one into engagement with the clutch teeth of the gear on the driving section, the other out of engagement with the clutch teeth of the fixed gear, and vice versa, whereby the driven section may operate for high speed or for second speed through the medium of the countershaft and the fixed gear, and means for operating said unitary means.

4. A transmission mechanism including a shaft consisting of axial driving and driven sections and a countershaft, the driven section provided with a gear couple with the countershaft, one of the gears of said couple being loose on the countershaft and provided with a sleeve, a clutch slidably keyed to the sleeve, a clutch slidably keyed to the driven section, a gear couple operatively connecting the countershaft and the driving section, the gears of said last mentioned couple having clutch teeth, a unitary member operatively connecting with said clutches of the driven section and the sleeve for moving them simultaneously, one to engage the clutch teeth of the gear of the driving section, the other out of engagement with the clutch teeth of the gear on the countershaft, and vice versa, whereby the driven section may operate for high speed direct from the driving section or the driven section operate for second speed through the gear couples and the countershaft, and means for operating the unitary member.

5. A transmission mechanism including a shaft comprising axial driving and driven sections, the former having a gear provided with clutch teeth, a countershaft with a fixed gear meshing with the first gear, said fixed gear having clutch teeth, a gear loose on the countershaft and operatively geared to the driven section and provided with a sleeve, clutch elements on the driven section and the sleeve respectively positioned to cooperate with the clutch teeth of the first two gears, unitary means operatively connecting with the last mentioned clutches for shifting them respectively, one into engagement with the clutch teeth of the gear on the driving section, the other out of engagement with the clutch teeth of the fixed gear, and vice versa, whereby the driven section may operate for high speed or for second speed through the medium of the countershaft and the fixed gear, said countershaft having a second fixed gear, a shifting gear on the driven section, and means for moving said shifting gear in engagement with the second fixed gear of the countershaft when the first mentioned clutch members are neutral for operating the driven section at low speed.

6. A transmission mechanism including a shaft consisting of axial driving and driven sections and a countershaft, the driven section provided with a gear couple with the countershaft, one of the gears of said couple being loose on the countershaft and provided with a sleeve, a clutch keyed to the sleeve, a clutch keyed to the driven section, a gear couple operatively connecting the countershaft and the driving section, the gears of said last mentioned couple having clutch teeth, a unitary member operatively connecting with said clutches of the driven section and the sleeve for moving them simultaneously, one to engage the clutch teeth of the gear of the driving section, the other out of engagement with the clutch teeth of the gear on the countershaft, and vice versa, whereby the driven section may operate for high speed direct from the driving section or the driven section operate for second speed through the first named gear couple and the countershaft, a gear fixed to the countershaft, a shiftable gear on the driven section, and means for moving said shifting gear of the driven section to mesh with the fixed gear of the countershaft when the clutch members are neutral, thereby operating the driven section at low speed.

7. A transmission mechanism including a casing and a shaft consisting of axial driving and driven sections and a countershaft, the driven section provided with a gear couple with the countershaft, one of the gears of said couple being loose on the countershaft and provided with a sleeve, a clutch splined on the sleeve, a clutch splined on the driven section, a gear couple operatively connecting the countershaft and the driving section, the gears of said last mentioned couple having clutch teeth, and a yoke mounted for oscillatory movement in the casing and operatively connecting with the clutch members for shifting them respectively, one into engagement with the clutch teeth of the gear of the driving section, the other out of engagement with the clutch teeth of the gear on the countershaft, and vice versa, whereby the driven section may operate direct from the driving section for high speed or operated for second speed through the gear couples and the countershaft.

8. A transmission mechanism including a casing and a shaft consisting of axial driving and driven sections and a countershaft, the driven section provided with a gear couple with the countershaft, one of the gears of said couple being loose on the countershaft and provided with a sleeve, a clutch keyed to the sleeve, a clutch keyed to the driven section, a gear couple operatively connecting the countershaft and the driving section, the gears of said last mentioned couple having clutch teeth, a yoke mounted for oscillatory movement in the casing and operatively connecting with the clutch members for shifting them respectively, one into engagement with the clutch teeth of the gear of the driving section, the other out of engagement with the clutch teeth of the gear on the countershaft, and vice versa, whereby the driven section may operate direct from the driving section for high speed or operated for second speed through the gear couples and the countershaft, a gear fixed to the countershaft, a gear shiftable upon the driven section, means for moving said shifting gear of the driven section to mesh with the fixed gear of the countershaft, when the clutch members are neutral, for operating the driven section at low speed, and a second countershaft with a double gear member thereon shiftable into engagement with the fixed gear of the first countershaft and the shiftable gear, when the clutches are neutral, for operating the driven section in reverse direction.

9. A transmission mechanism including a shaft consisting of axial driving and driven sections and a countershaft, the driven sections provided with a gear couple with the countershaft, one of the gears of said couple being loose on the countershaft and provided with a sleeve, a clutch keyed to the sleeve, a clutch keyed to the driven section, a gear couple operatively connecting the countershaft and the driving section, the gears of said last mentioned couple having clutch teeth, a unitary member operatively connecting with said clutches of the driven section and the sleeve for moving them simultaneously, one to engage the clutch teeth of the gear of the driving section, the other out of engagement with the clutch teeth of the gear on the countershaft, and vice versa, whereby the driven section may operate for high speed direct from the driving section or the driven section operate for second speed through the gear couples and the countershaft, a gear fixed to the countershaft, a shiftable gear on the driven section, means for moving said shifting gear of the driven section to mesh with the fixed gear of the countershaft when the clutch members are neutral, thereby operating the driven section at low speed, a second countershaft, a double gear member shiftable thereon for meshing with the shiftable gear of the driven section and the fixed gear of the first countershaft, when said clutch members are neutral, for operating the driven section in a reverse direction, and means for shifting the double gear member.

10. A transmission mechanism including a casing and a shaft consisting of axial driving and driven sections and a countershaft, the driven section provided with a gear couple with the countershaft, one of the gears of said couple being loose on the countershaft and provided with a sleeve, a clutch splined on the sleeve, a clutch splined on the driven section, a gear couple operatively connecting the countershaft and the driving section, the gears of said last mentioned couple having clutch teeth, a yoke mounted for oscillatory movement in the casing and operatively connecting with the clutch members for shifting them respectively, one into engagement with the clutch teeth of the gear of the driving section, the other out of engagement with the clutch teeth of the gear on the countershaft, and vice versa, whereby the driven section may operate direct from the driving section for high speed or operated for second speed through the gear couples and the countershaft, and means for operating said yoke.

In testimony whereof he affixes his signature.

FRANK H. JONES.